United States Patent
Konishi

(10) Patent No.: US 10,598,226 B2
(45) Date of Patent: Mar. 24, 2020

(54) BEARING DEVICE FOR VEHICLE WHEEL

(71) Applicant: NTN CORPORATION, Osaka-shi, Osaka (JP)

(72) Inventor: Ryo Konishi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/080,861

(22) PCT Filed: Feb. 28, 2017

(86) PCT No.: PCT/JP2017/007941
§ 371 (c)(1),
(2) Date: Aug. 29, 2018

(87) PCT Pub. No.: WO2017/150562
PCT Pub. Date: Sep. 8, 2017

(65) Prior Publication Data
US 2019/0070900 A1 Mar. 7, 2019

(30) Foreign Application Priority Data
Mar. 2, 2016 (JP) .................................. 2016-040533

(51) Int. Cl.
*F16C 41/00* (2006.01)
*F16C 19/18* (2006.01)
(Continued)

(52) U.S. Cl.
CPC ............ *F16C 41/007* (2013.01); *B60B 35/02* (2013.01); *F16C 19/18* (2013.01); *F16C 19/185* (2013.01);
(Continued)

(58) Field of Classification Search
CPC ...... F16C 19/186; F16C 41/00; F16C 41/007; F16C 2326/02; B60B 27/0005; B60B 27/001; G01P 1/02
(Continued)

(56) References Cited

U.S. PATENT DOCUMENTS 10,099,509 B2 * 10/2018 Konishi ................. F16C 41/007
2017/0001471 A1 * 1/2017 Fukuda ................. F16C 41/007
2018/0003238 A1 * 1/2018 Takayama ............. F16C 41/007

FOREIGN PATENT DOCUMENTS

| JP | 2004-354066 | 12/2004 |
|----|-------------|---------|
| JP | 2004-354299 | 12/2004 |
| JP | 2015-218855 | 12/2015 |

OTHER PUBLICATIONS

International Search Report dated Apr. 25, 2017 in International (PCT) Application No. PCT/JP2017/007941.

* cited by examiner

*Primary Examiner* — James Pilkington
(74) *Attorney, Agent, or Firm* — Wenderoth, Lind & Ponack, L.L.P.

(57) ABSTRACT

A bearing device (1) for a vehicle wheel is provided with: a magnetic encoder (7) provided to an inner-side end of an inner race (4), which is an inward member; a cover (11) for covering an inner-side opening (2B) of an outer race (2), which is an outward member, the cover having opened therein a sensor attachment hole (11H) in which an opening (11A) and a thin-walled bottom (11B) are formed; and a magnetic sensor (9) disposed facing the magnetic encoder across the bottom. The magnetic sensor is inserted into the sensor attachment hole in the cover through the opening (11A). The bottom (11B) in the sensor attachment hole is formed in such a shape as to bulge toward the inner side.

3 Claims, 3 Drawing Sheets

(51) Int. Cl.
 *B60B 27/00* (2006.01)
 *B60B 35/02* (2006.01)
 *G01P 1/02* (2006.01)

(52) U.S. Cl.
 CPC .......... *F16C 41/00* (2013.01); *B60B 27/0005* (2013.01); *F16C 2326/02* (2013.01); *G01P 1/026* (2013.01)

(58) Field of Classification Search
 USPC ........................................................ 384/448
 See application file for complete search history.

[FIG.1]
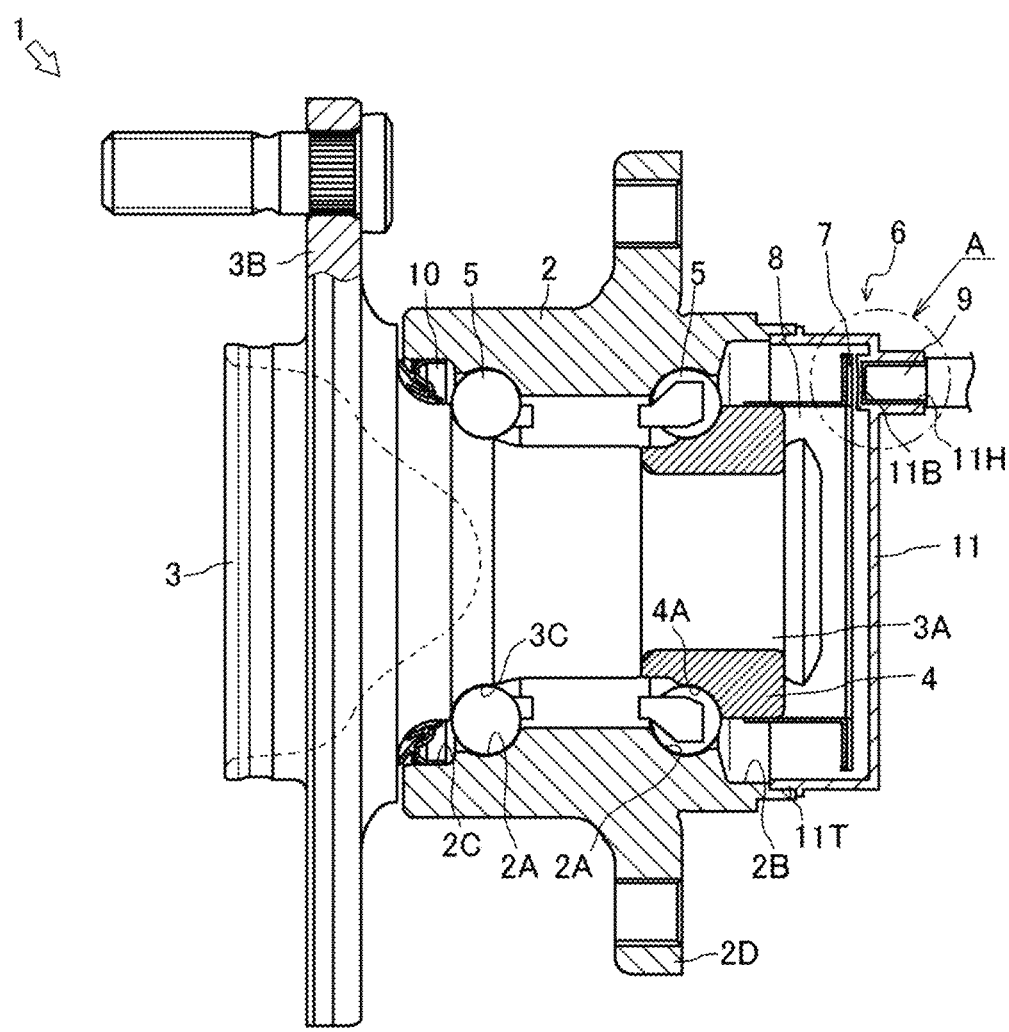

[FIG.2]
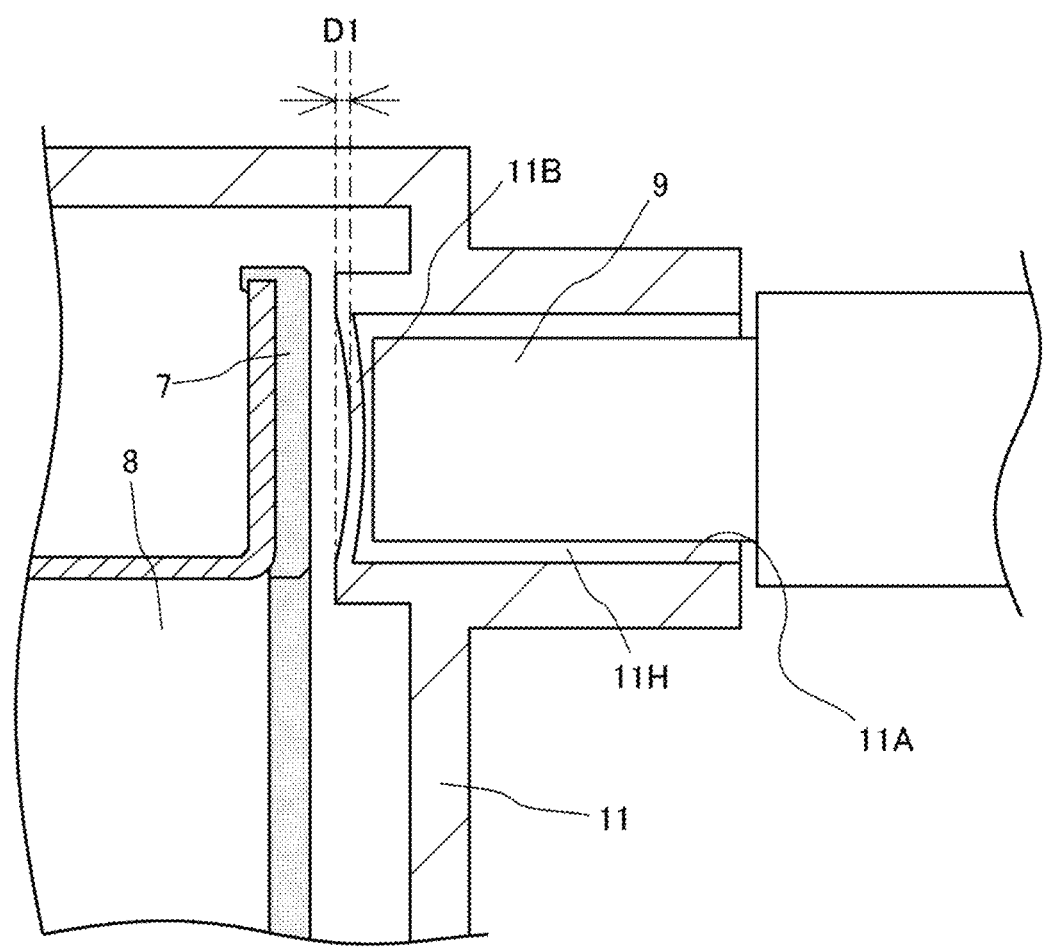

[FIG.3]
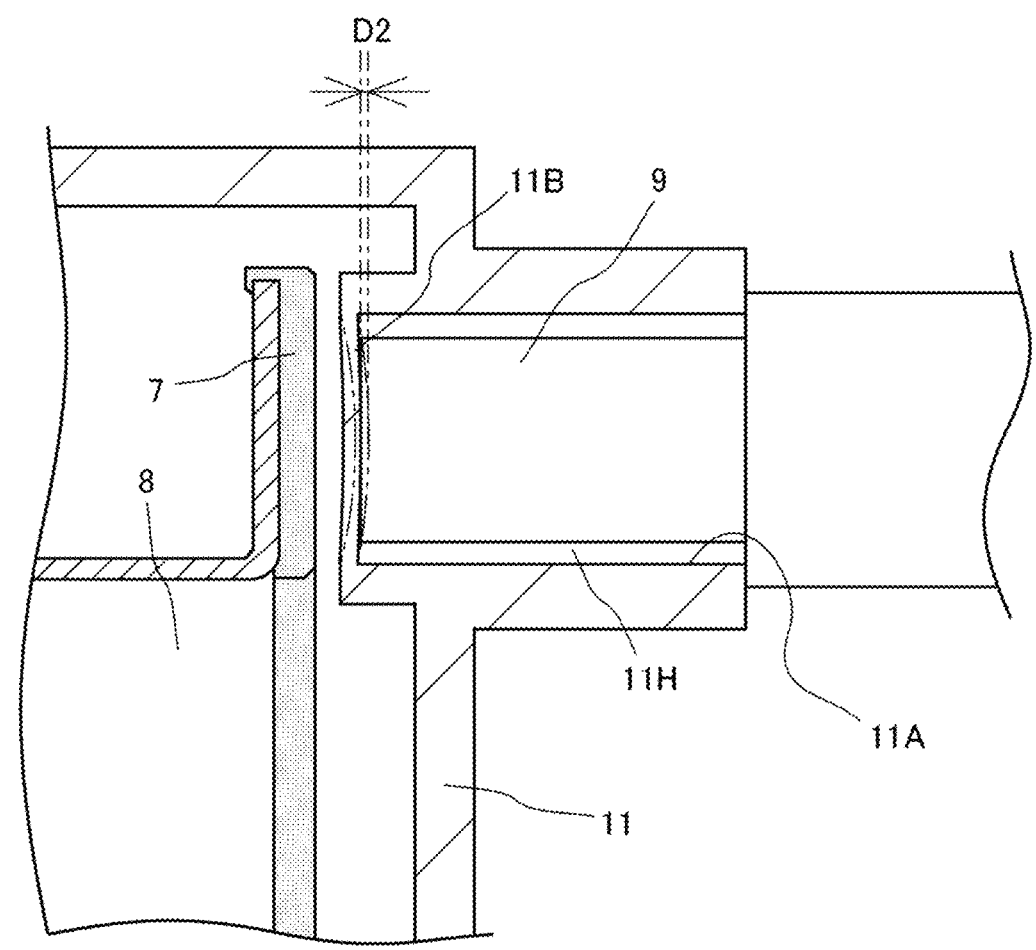

BEARING DEVICE FOR VEHICLE WHEEL

BACKGROUND OF THE INVENTION

1. Technical Field

The present invention relates to a bearing device for a vehicle wheel. More specifically, the present invention relates to a bearing device for a vehicle wheel, the bearing device including an outer member, a cover fit on the outer member, and a magnetic sensor mounted to the cover.

2. Description of the Related Art

A conventionally known bearing device for a vehicle wheel is configured to rotatably support a vehicle wheel in a suspension of, for example, an automobile. The bearing device includes a rotation speed detector that detects a rotation speed of the vehicle wheel. The bearing device also includes a wheel hub that is connected to the vehicle wheel, and a rolling element that rotatably supports the wheel hub. The rotation speed detector of the bearing device includes a magnetic sensor and a magnetic encoder that is magnetized such that different magnetic poles are arranged alternately and circumferentially. In the bearing device, the magnetic encoder is fixed to an inner ring that integrally rotates with the wheel hub, and the magnetic sensor is disposed on a portion that does not integrally rotate with the wheel hub. The bearing device is configured to detect the rotation speed of the vehicle wheel connected to the wheel hub, based on an interval of change in magnetism at the time when the magnetic encoder that integrally rotates with the wheel hub passes by the magnetic sensor.

According to a known technique as to such a bearing device for a vehicle wheel, an outer member is provided with a cover that is made of resin. The cover has a mounting bore that is formed in a one-end closed cylindrical shape. A magnetic sensor is inserted into the mounting bore. The magnetic sensor is thus mounted to the cover. For example, JP 2004-354066 discloses such a technique.

In a bearing device for a vehicle wheel disclosed in JP 2004-354066, a mounting bore has a thin bottom. This configuration enables a reduction in gap between a magnetic sensor and a magnetic encoder. As a result, the magnetic sensor interferes with the bottom of the mounting bore. The bottom is damaged due to its deformation, which may result in reduction of rotation speed detecting accuracy. In addition, when the magnetic sensor interferes with the bottom of the mounting bore, the bottom becomes deformed toward the magnetic encoder, which may cause interference of the magnetic encoder with the bottom. If the magnetic encoder interferes with the cover, wearing encoder rubber may cause an ABS to malfunction. Moreover, wear in or damage to the bottom may cause muddy water to enter the bearing device.

SUMMARY OF THE INVENTION

1. Technical Problem

The present invention has been made in view of the circumstances described above. An object of the present invention is to provide a bearing device for a vehicle wheel, the bearing device being capable of, even when a magnetic sensor interferes with a bottom of a mounting bore, suppressing deformation of the bottom to prevent damage to the bottom, reduction in rotation speed detecting accuracy, and interference of a magnetic encoder with the bottom.

2. Solutions to the Problems

A bearing device for a vehicle wheel includes an outer member, an inner member, double-row rolling elements, a magnetic encoder, a cover, and a magnetic sensor. The outer member has, on its inner circumference, double-row outer raceway surfaces integrally formed on the outer member. The inner member includes a wheel hub and at least one inner ring. The wheel hub has, on its one end, a vehicle wheel-mounting flange to which a vehicle wheel is mounted, the vehicle wheel-mounting flange being integrally formed on the wheel hub. The wheel hub also has, on its outer circumference, a cylindrical portion extending axially. The at least one inner ring is press-fit on the cylindrical portion of the wheel hub. The inner member has, on its outer circumference, double-row inner raceway surfaces facing the double-row outer raceway surfaces. The double-row rolling elements are rollably accommodated between the double-row inner raceway surfaces of the inner member and the double-row outer raceway surfaces of the outer member, respectively. The magnetic encoder is disposed on an inner-side end of the inner member. The cover has a sensor mounting bore having, an inner side of the sensor mounting bore, an opening and, on an outer side of the sensor mounting bore, a bottom that is thin. The cover is configured to cover an inner-side opening of the outer member. The magnetic sensor is inserted into the sensor mounting bore in the cover through the opening of the sensor mounting bore. The magnetic sensor is disposed to face the magnetic encoder with the bottom of the sensor mounting bore interposed between the magnetic sensor and the magnetic encoder. The bottom of the sensor mounting bore bulges toward the inner side of the sensor mounting bore.

In addition, the bottom bulging toward the inner side of the sensor mounting bore has a thickness larger than an allowance of interference on an assumption that the magnetic sensor interferes with the bottom.

3. Advantageous Effects of the Invention

The present invention produces the following advantageous effects.

A bearing device for a vehicle wheel suppresses deformation of a bottom of a mounting bore even when a magnetic sensor interferes with the bottom of the mounting bore. The bearing device also prevents damage to the bottom, reduction in rotation speed detecting accuracy, and interference of a magnetic encoder with the bottom.

In addition, the bearing device prevents the bottom of the sensor mounting bore from bulging toward the magnetic encoder due to the deformation of the bottom even when the magnetic sensor interferes with the bottom. The bearing device therefore prevents interference of the magnetic encoder with the bottom.

BRIEF DESCRIPTION OF THE DRAWINGS

FIG. 1 is a perspective view of a configuration of a rotation speed detector in a bearing device for a vehicle wheel according to an embodiment.

FIG. 2 is an enlarged view of a portion surrounded with a chain double-dashed line A in FIG. 1.

FIG. 3 is an enlarged view of the portion surrounded with the chain double-dashed line A in FIG. 1 and illustrates a magnetic sensor interfering with a bottom of a mounting bore.

DETAILED DESCRIPTION OF EMBODIMENTS OF THE INVENTION

With reference to FIG. 1, a description will be given of a bearing device 1 as a bearing device for a vehicle wheel according to an embodiment.

As illustrated in FIG. 1, the bearing device 1 is configured to rotatably support a vehicle wheel, in a suspension of a vehicle such as an automobile. The bearing device 1 includes an outer ring 2, a wheel hub 3, an inner ring 4, two ball rows 5 as rolling elements, a rotation speed detector 6 (e.g., an encoder), a seal member 10, and a cover 11.

The outer ring 2 serves as an outer member. The outer ring 2 is configured to support the wheel hub 3. The outer ring 2 is formed in a substantially cylindrical shape. The outer ring 2 is made of medium- or high-carbon steel containing 0.40 to 0.80 wt % carbon, such as S53C. The outer ring 2 has, on its inner circumference, outer raceway surfaces 2A each formed in a circumferentially annular shape. The outer raceway surfaces 2A are parallel to each other on a first side (i.e., an inner side) and a second side (i.e., an outer side) of the outer ring 2. The outer raceway surfaces 2A each have a hardened layer formed by induction hardening with a surface hardness in a range from 58 to 64 HRC. The outer ring 2 has, in its first-side end (i.e., its inner-side end), a first-side opening 2B to which the cover 11 is fittable. The outer ring 2 also has, in its second-side end (i.e., its outer-side end), a second-side opening 2C to which the seal member 10 is fittable. The outer ring 2 also has, on its outer circumference, a vehicle body-mounting flange 2D to be mounted onto a knuckle (not illustrated) of the suspension. The vehicle body-mounting flange 2D is integrally formed on the outer ring 2.

The wheel hub 3 is configured to rotatably support the vehicle wheel (not illustrated) of the vehicle. The wheel hub 3 is formed in a one-end closed cylindrical shape. The wheel hub 3 is made of medium- or high-carbon steel containing 0.40 to 0.80 wt % carbon, such as S53C. The wheel hub 3 has, on its first-side end outer circumference (i.e., its inner-side end outer circumference), a cylindrical portion 3A of which the diameter is reduced. The wheel hub 3 also has, on its second-side end (i.e., its outer-side end), a vehicle wheel-mounting flange 3B onto which the vehicle wheel is to be mounted. The vehicle wheel-mounting flange 3B is integrally formed on the wheel hub 3. The vehicle wheel-mounting flange 3B is provided with hub bolts at regular intervals about its circumference. The wheel hub 3 also has, on its second-side outer circumference, an inner raceway surface 3C formed in a circumferentially annular shape.

The inner ring 4 is press-fit on the cylindrical portion 3A on the first-side end of the wheel hub 3. The wheel hub 3 and the inner ring 4 serve as an inner member. The inner ring 4 is made of high-carbon chromium bearing steel such as SUJ2. The inner ring 4 is hardened in a range from 60 to 64 HRC to its core by quenching, with coolant. The inner ring 4 has, on its outer circumference, an inner raceway surface 4A formed in a circumferentially annular shape. The inner ring 4 is integrally fixed on the first-side end of the wheel hub 3 with a predetermined preload applied thereto. The preload is applied in such a manner that the first-side end of the wheel hub 3 is plastically deformed (i.e., caulked) radially outward. In other words, the inner ring 4 forms the inner raceway surface 4A on the first side of the wheel hub 3. A part of the wheel hub 3, ranging from the cylindrical portion 3A on the first side to the inner raceway surface 3C on the second side, is hardened by induction hardening with a surface hardness in a range from 62 to 67 HRC. The wheel hub 3 thus has sufficient mechanical strength to rotary bending load to be applied to the vehicle wheel-mounting flange 3B. The durability of the wheel hub 3 is therefore increased. The caulked portion on the first-side end still has a surface hardness after forging. The inner raceway surface 4A of the inner ring 4, which is formed on the first-side end of the wheel hub 3, faces the outer raceway surface 2A on the first side of the outer ring 2. On the other hand, the inner raceway surface 3C on the second side of the wheel hub 3 faces the outer raceway surface 2A on the second side of the outer ring 2.

The two ball rows 5 as rolling elements are configured to rotatably support the wheel hub 3. Each of the ball rows 5 includes a plurality of balls and a cage in which the balls are retained annularly. Each of the ball rows 5 is made of high-carbon chromium bearing steel such as SUJ2. Each of the ball rows 5 is hardened in a range from 58 to 64 HRC to its core by quenching, with coolant. One of the two ball rows 5 is rollably sandwiched between the inner raceway surface 4A of the inner ring 4 and the outer raceway surface 2A on the first side of the outer ring 2. The outer raceway surface 2A of the outer ring 2 faces the inner raceway surface 4A of the inner ring 4. The other ball row 5 is rollably sandwiched between the inner raceway surface 3C of the wheel hub 3 and the outer raceway surface 2A on the second side of the outer ring 2. The outer raceway surface 2A of the outer ring 2 faces the inner raceway surface 3C of the wheel hub 3. In other words, the two ball rows 5 rotatably support the wheel hub 3 and the inner ring 4 with respect to the outer ring 2. In the bearing device 1, the outer ring 2, the wheel hub 3, the inner ring 4, and the two ball rows 5 form double-row angular ball bearings. In this embodiment, the bearing device 1 includes, but not limited to, the double-row angular ball bearings. The bearing device 1 may include, for example, double-row tapered roll bearings.

The rotation speed detector 6 is configured to detect an axial rotation speed of the wheel hub 3. The rotation speed detector 6 is an encoder including a magnetic encoder 7 and a magnetic sensor 9.

The magnetic encoder 7 is formed in an annular shape and is made of synthetic rubber into which magnetic powder, such as ferrite, is mingled. The magnetic encoder 7 is magnetized such that magnetic poles N and S are arranged circumferentially with equal pitches. The magnetic encoder 7 is integrally adhered to a flanged portion of a supporting member 8, via vulcanized adhesive. The supporting member 8 is formed in a cylindrical shape, and the flanged portion is on a first-side end of the supporting member 8. The supporting member 8 has, on its second-side end, a cylindrical portion on which the inner ring 4 is fit. In other words, the magnetic encoder 7 is on a first-side end (i.e., an inner-side end) of the inner ring 4. The magnetic encoder 7 is integrally rotatable with the wheel hub 3 via the supporting member 8 and the inner ring 4. The supporting member 8 is press-formed from a ferromagnetic steel plate for improving rust resistance and for improving stability in detecting accuracy. Examples of such a ferromagnetic steel plate include a ferritic stainless steel sheet (e.g., JIS SUS 430) and a preserved cold rolled steel sheet (e.g., JIS SPCC).

The magnetic sensor 9 is configured to detect magnetism of the magnetic encoder 7. The magnetic sensor 9 is disposed on the outer ring 2 such that its detection-side end is directed to the magnetic encoder 7 by the cover 11 to be described later. The magnetic sensor 9 is disposed away from the magnetic encoder 7 by a predetermined air gap (i.e., an axial clearance) with a bottom 11B of the cover 11 interposed between the magnetic sensor 9 and the magnetic encoder 7. The magnetic encoder 7 integrally rotates with the wheel hub 3, so that the magnetic poles N and S alternately pass a detection area of the magnetic sensor 9. The magnetic sensor 9 detects a passage time of each magnetic pole.

As illustrated in FIG. 1, the seal member 10 is configured to seal a clearance between the outer ring 2 and the wheel hub 3. The seal member 10 is made of synthetic rubber such as nitrile rubber. The seal member 10 is integrally adhered to a metal core via vulcanized adhesive. The metal core is formed in a substantially cylindrical shape. The seal member 10 has on its inner side a plurality of lips. The seal member 10 has a cylindrical portion fit to the second-side (i.e., outer-side) opening 2C of the outer ring 2. The lips of the seal member 10 are in contact with the outer circumference of the wheel hub 3. The lips of the seal member 10 are slidable by an oil film between the outer circumference of the wheel hub 3 and the lips. The seal member 10 thus enables hermetic seal of lubricating grease inside the bearing. The seal member 10 also prevents, for example, outside rainwater and dust from entering the bearing.

As illustrated in FIG. 1, the cover 11 is configured to seal the first-side (i.e., inner-side) opening 2B of the outer ring 2 so as to protect the magnetic encoder 7. The cover 11 is made of synthetic resin and is formed in a one-end closed cylindrical shape. The cover 11 has a cylindrical portion 11T press-fit to an inner circumference of the opening 2B. The cover 11 is thus mounted to the outer ring 2 to seal the opening 2B. The cylindrical portion 11T has a flange that abuts against a first end face of the outer ring 2. The entire cover 11 is thus positioned axially with respect to the outer ring 2. This configuration enables position control for the magnetic sensor 9 to be mounted to the cover 11.

As illustrated in FIG. 2, the cover 11 also has a sensor mounting bore 11H formed in a tubular shape. The magnetic sensor 9 is inserted into the sensor mounting bore 11H. The sensor mounting bore 11H has, on an inner side of sensor mounting bore, an opening 11A and, on an outer side of sensor mounting bore, a bottom 11B that is thin. The bottom 11B is integrally formed with the cover 11 and is made of non-magnetic synthetic resin. The bottom 11B therefore exerts no adverse influence on the rotation speed detecting accuracy of the magnetic sensor 9.

The magnetic sensor 9 is inserted into the sensor mounting bore 11H in the cover 11 through the opening 11A of the sensor mounting bore 11H. The magnetic sensor 9 is thus mounted to the cover 11. The magnetic sensor 9 is disposed to face the magnetic encoder 7 with the bottom 11B of the sensor mounting bore 11H interposed between the magnetic sensor 9 and the magnetic encoder 7. In this embodiment, since the sensor mounting bore 11H has the bottom 11B that is thin, the gap between the magnetic sensor 9 and the magnetic encoder 7 is reduced. The magnetic sensor 9 converts magnetic field variation detected, into an electric signal proportional to a rotation speed. The magnetic sensor 9 then outputs the electric signal via a cable (not illustrated).

According to the bearing device 1 configured as described above, the outer ring 2, the wheel hub 3, the inner ring 4, and the two ball rows 5 form the double-row angular ball bearings. In addition, the wheel hub 3 is rotatably supported on the outer ring 2 via the two ball rows 5. According to the bearing device 1, the magnetic encoder 7 of the rotation speed detector 6 is fixed to the wheel hub 3 and is protected by the cover 11. According to the bearing device 1, the magnetic sensor 9 fixed to the outer ring 2 detects a change in magnetism of the magnetic encoder 7 that integrally rotates with the wheel hub 3. According to the bearing device 1, the magnetic sensor 9 is fixed to the outer ring 2, which reduces variations in positional relationship between the magnetic sensor 9 and the magnetic encoder 7. The magnetic sensor 9 thus stably detects the magnetism of the magnetic encoder 7.

With reference to FIGS. 2 and 3, next, a description will be given of the shape of the sensor mounting bore 11H in the cover 11. As described above, the bottom 11B of the sensor mounting bore 11H is thin. In addition, as illustrated in FIG. 2, the bottom 11B bulges toward the inner side of the sensor mounting bore. Specifically, the bottom 11B has a center deformed toward the inner side of the sensor mounting bore to define a curved face. The bottom 11B has a uniform thickness. The bottom 11B therefore has an inner-side face that bulges toward the inner side, and an outer-side face that is recessed. In this embodiment, the bottom 11B bulges toward the inner side of the sensor mounting bore in an amount of 0.05 to 0.5 mm, more specifically, in an amount of 0.1 mm. In other words, the outer-side of the sensor mounting bore face of the bottom 11B is recessed by 0.1 mm.

In the bearing device 1 according to this embodiment, as described above, the bottom 11B is formed to bulge toward the inner side of the sensor mounting bore in advance. Therefore, even when the magnetic sensor 9 interferes with the bottom 11B of the sensor mounting bore 11H, large reaction force is applied to the magnetic sensor 9. The bottom 11B is thus less likely to become deformed as illustrated in FIG. 3. Even when the bottom 11B becomes deformed due to the interference of the magnetic sensor 9 with the bottom 11B, the degree of deformation is lesser than that in the conventional art. The bearing device 1 according to this embodiment therefore prevents damage to the bottom 11B, reduction in rotation speed detecting accuracy of the magnetic sensor 9, and interference of the magnetic encoder 7 with the bottom 11B.

Also in the bearing device 1 according to this embodiment, as illustrated in FIG. 2, a thickness of the bulging portion of the bottom 11B is equal to a depth D1 of the recess in the bottom 11B (more specifically, a displacement between the center and the peripheral edge of the bottom 11B). FIG. 3 illustrates a maximum allowance D2 of interference on the assumption that the magnetic sensor 9 interferes with the bottom 11B. As illustrated in FIGS. 2 and 3, the depth D1 of the recess in the bottom 11B is larger than the maximum allowance D2 of interference of the magnetic sensor 9 with the bottom 11B. As illustrated in FIG. 3, this configuration prevents the bottom 11B of the sensor mounting bore 11H from bulging toward the magnetic encoder 7 due to the deformation of the bottom 11B even when the magnetic sensor 9 interferes with the bottom 11B. In other words, this configuration prevents interference of the magnetic encoder 7 with the bottom 11B.

Although the embodiment of the present invention is described above, the present invention is not limited to the embodiment, which is described by way of example. The present invention can be naturally carried out in various modes without departing from the spirit and scope of the present invention. The scope of the present invention is shown by claims and contains all modifications having the same content and scope as the claims or their equivalents.

The bearing device for a vehicle wheel according to the present invention suppresses deformation of a bottom of a mounting bore even when a magnetic sensor interferes with the bottom of the mounting bore. The bearing device also prevents damage to the bottom, reduction in rotation speed detecting accuracy, and interference of a magnetic encoder with the bottom.

The invention claimed is:

1. A bearing device for a vehicle wheel, the bearing device comprising:
   an outer member having a first and a second outer raceway surface integrally formed on an inner circumference of the outer member;
   an inner member including
      a wheel hub configured to rotatably support a vehicle wheel, the wheel hub having a vehicle wheel-mounting flange and an axially extending cylindrical portion, the vehicle wheel-mounting flange being integrally formed with the cylindrical portion, and
      at least one inner ring press-fit on the cylindrical portion of the wheel hub,
   the inner member having a first and a second inner raceway surface formed on an outer circumference of the inner member and facing the first and second outer raceway surfaces, respectively;
   rolling elements rollably accommodated between the first and second inner raceway surfaces of the inner member and the first and second outer raceway surfaces of the outer member, respectively;
   a magnetic encoder disposed on an inner-side end of the inner member;
   a cover configured to cover an opening of the outer member, the cover including a sensor mounting bore having, on a side of the sensor mounting bore, an opening and, on an opposite side of the sensor mounting bore, a bottom that is thinner than adjoining walls of the cover; and
   a magnetic sensor inserted into the sensor mounting bore in the cover through the opening of the sensor mounting bore, and disposed to face the magnetic encoder with the bottom of the sensor mounting bore interposed between the magnetic sensor and the magnetic encoder,
   wherein the bottom of the sensor mounting bore bulges toward the opening of the sensor mounting bore.

2. The bearing device according to claim 1, wherein the bottom has a uniform thickness such that an inner-side face of the bottom bulges toward the opening of the sensor mounting bore, and an outer-side face is recessed.

3. The bearing device according to claim 2, wherein the outer-side face is recessed by an amount of 0.05 mm to 0.5 mm.

* * * * *